US009123459B2

United States Patent
Marzahn et al.

(10) Patent No.: US 9,123,459 B2
(45) Date of Patent: *Sep. 1, 2015

(54) ARRANGEMENT WITH AT LEAST ONE SUPERCONDUCTIVE CABLE

(71) Applicant: NEXANS, Paris (FR)

(72) Inventors: Erik Marzahn, Langenhagen (DE); Christian Eric Bruzek, Thun St Martin (FR)

(73) Assignee: NEXANS, Paris (FR)

( * ) Notice: Subject to any disclaimer, the term of this patent is extended or adjusted under 35 U.S.C. 154(b) by 102 days.

This patent is subject to a terminal disclaimer.

(21) Appl. No.: 13/936,581

(22) Filed: Jul. 8, 2013

(65) Prior Publication Data

US 2014/0162883 A1    Jun. 12, 2014

(30) Foreign Application Priority Data

Jul. 11, 2012    (EP) ..................................... 12305829

(51) Int. Cl.
*H01B 12/16*    (2006.01)
*H01B 12/14*    (2006.01)

(52) U.S. Cl.
CPC ................ *H01B 12/16* (2013.01); *H01B 12/14* (2013.01); *Y02E 40/645* (2013.01); *Y02E 40/647* (2013.01)

(58) Field of Classification Search
CPC ........ H01B 12/16; H01B 12/14; H01B 12/00; H01F 6/06
USPC ......... 505/150, 163, 230, 231, 433; 174/15.5, 174/125.1
See application file for complete search history.

(56) References Cited

U.S. PATENT DOCUMENTS

| 8,934,951 B2 * | 1/2015 | Schmidt et al. ............... 505/230 |
| 2009/0229848 A1 * | 9/2009 | Hirose et al. ................. 174/15.5 |
| 2009/0247412 A1 * | 10/2009 | Maguire et al. ............... 505/231 |
| 2010/0179062 A1 * | 7/2010 | Soika et al. .................... 505/163 |

FOREIGN PATENT DOCUMENTS

| DE | 1 948 520 | 4/1971 | |
| DE | 1948520 A1 * | 4/1971 | ............. H01B 12/14 |
| EP | 2 234 122 | 9/2010 | |
| JP | 2002-352645 | 5/2001 | |

OTHER PUBLICATIONS

Test Facility for the Reception of the Superconducting Cables for the LHC 1998.*

* cited by examiner

*Primary Examiner* — Timothy Thompson
*Assistant Examiner* — Guillermo Egoavil
(74) *Attorney, Agent, or Firm* — Sofer & Haroun, LLP

(57) ABSTRACT

An arrangement is provided at least one superconductive cable (4) and a first cryostat (K1). A second cryostat (K2) is provided, formed coaxially with and at a distance from the first cryostat (K1). Arranged in the intermediate space (12) between the first cryostat (K1) and the second cryostat (K2) is a high voltage resistant insulation (16) which completely surrounds the outer pipe (10) of the first cryostat (K1), and which rests on the latter, where liquefied gas conducted during the operation of the arrangement flows through the intermediate space (12) around the insulation and impregnates the insulation.

2 Claims, 1 Drawing Sheet

ARRANGEMENT WITH AT LEAST ONE SUPERCONDUCTIVE CABLE

RELATED APPLICATION

This application claims the benefit of priority from European Patent Application No. 12 305 829.9, flied on Jul. 11, 2012, the entirety of which is incorporated by reference.

BACKGROUND

1. Field of the Invention

The invention relates to an arrangement with at least one superconductive cable and a first cryostat surrounding the cable for conducting a first cooling agent, wherein the cryostat is composed of two pipes of metal which extend coaxially and at a distance from each other, and a thermal insulation enclosed between the pipes, and wherein the cryostat surrounds over its entire length a hollow space in which the cable is arranged and through which the first cooling agent is conducted during operation of the arrangement, wherein the first cooling agent used is a liquid or gaseous cooling agent cooled to a temperature of 39K or lower, and wherein a second cryostat for conducting a second cooling agent is arranged coaxially around the first cryostat and at a distance from the first cryostat, wherein the second cryostat is also composed of two pipes of metal extending coaxially and at a distance and a thermal insulation enclosed between the pipes, and wherein a liquefied gas having a temperature of 112K or lower is conducted through the second cryostat during operation of the arrangement.

Such an arrangement is disclosed, for example, in DE 19 48 520 A1.

2. Brief Description of the Prior Art

A superconductive cable has electrical conductors of a material which changes over into the superconductive state at sufficiently low temperatures. The electrical direct current resistance of a conductor constructed accordingly is zero at sufficient cooling as long as a certain voltage—the critical voltage—is not exceeded. Suitable materials are, for example, oxidic materials on the basis of rare earths (ReBCO), particularly YBCO (Yttrium-barium-copper oxide), or BSCCO (bismuth-strontium-calcium-copper oxide). Sufficiently low temperatures for bringing such a material into the superconductive state are, for example, between 67K and 110K. Suitable cooling agents are, for example, nitrogen, helium, neon and hydrogen, or mixtures of these materials. Since the indicated temperatures are significantly above the absolute zero point, of $-273.16'C.=0K$, conductors of the corresponding materials are referred to as high temperature superconductors (HTS-conductors). This is also true for other superconductive materials, for example magnesium diboride, which change over into the superconductive state at temperatures of about 39K or lower, which are also significantly above 0K.

EP 2 234 122 B1 discloses an arrangement in which a superconductive cable is arranged in a cryostat. The cryostat is composed of two pipes of metal which are arranged concentrically and at a distance from each other and which include therebetween a thermal insulation constructed as a vacuum insulation. Used as superconductive materials are the oxidic materials on the basis of rare earths already mentioned above. For example, liquid nitrogen, which can be kept at a sufficiently low temperature with a conventional vacuum insulated cryostat over a longer period of time, is used for cooling the cable. Liquid nitrogen cannot be used for low temperatures which are below 63K because it changes into a solid state at these temperatures. In addition, it is increasingly difficult to keep the cooling agent which has the appropriate low temperature at this temperature for a longer period of time.

JP 2002352645 A describes a system with a superconductive cable in which magnesium diboride is used as superconductive material. The cable is surrounded by a cryostat composed of two pipes arranged concentrically relative to each other with an insulation arranged in the pipes. In addition, the space between the two pipes is evacuated. The outer pipe is surrounded by an electrical insulation onto which are wound two layers of steel bands as mechanical protection.

The aforementioned DE 19 48 520 A1 describes an arrangement with a pipe line for frozen cables with two concentrically arranged cryostats which are both composed of two concentric pipes having a vacuum therebetween. Cooling agents having different temperatures are conducted through the two cryostats, for example, liquid helium is conducted through the inner cryostat and for example, liquid nitrogen is conducted through the outer cryostat. Suitable materials for the cable constructed as a superconductive cable are, for example, alloys of niobium and titanium, or niobium and zirconium, as well as a niobium-tin compound are mentioned.

OBJECTS AND SUMMARY

The invention is based on the object of constructing the above mentioned arrangement in such a way that it can be used in a simple manner also for cables having superconductive materials which must be cooled for achieving the superconductive state to a temperature of 39K or lower, while simultaneously improving the electrical properties of the cable.

In accordance with the invention, the object is met in that
magnesium diboride is used as superconductive material,
high voltage proof insulation is arranged in the intermediate space between the first cryostat and the second cryostat, wherein the insulation completely surrounds the pipe of the first cryostat and rests on the latter, wherein the liquefied gas conducted through the space flows around the first cryostat and is impegnated by the liquefied gas.

In this arrangement magnesium diboride, which in contrast to oxidic superconductive materials is less expensive, can be used as superconductive material. This material additionally has an increased current support capability as compared to the oxidic materials. The arrangement is generally of relatively simple construction because the second cryostat corresponds in its construction to the first cryostat and can be shaped around the first cryostat with uniform technology. The fact that a second cryostat is provided already means that there is an increased protection against external heat influences for the cooling agent conducted in the first cryostat. This protective effect of the second cryostat is significantly increased by the liquefied gas which is conducted during the operation of the arrangement through the latter. As a result, the second cryostat has altogether the effect of a heat shield for the first cryostat so that the cooling agent conducted in the first cryostat is conducted over a relatively long stretch along the arrangement, where a sufficiently low cooing temperature can be maintained. The high voltage resistant insulation mounted in the second cryostat, which completely surrounds the outer pipe of the first cryostat and rests thereon, achieves significantly improved dielectric values by the liquefied as which flows around the insulation and by which the insulation is impregnated.

BRIEF DESCRIPTION OF THE DRAWINGS

An embodiment of the subject matter of the invention is illustrated in the drawings.

In the drawing.

DETAILED DESCRIPTION

For example, liquid hydrogen with a cooling temperature of about 20.28K, liquid neon with a cooling temperature of about 27.07K and helium gas with a cooling temperature of 39K or lower are suitable as the first cooling agent. In the following, helium gas is taken into consideration as the first cooling agent representing all suitable cooling agents.

Figure 1:
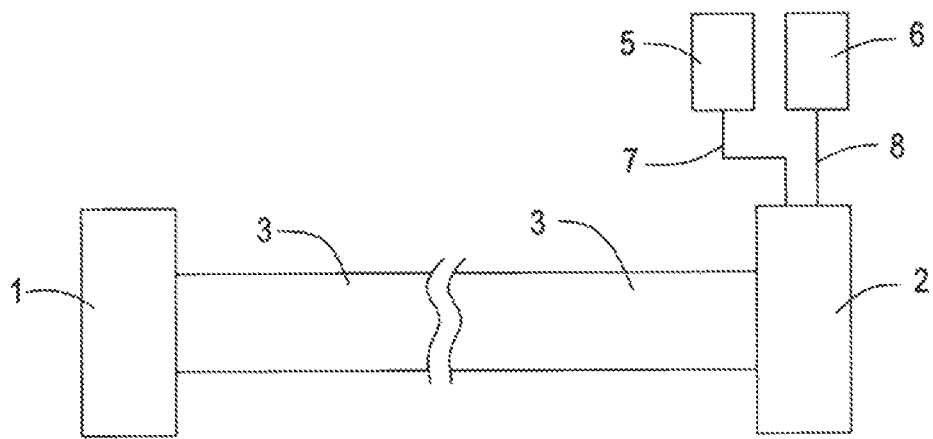
FIG. 1 schematically shows a transmission stretch for electrical energy with an arrangement according to the invention.

The transition stretch according to FIG. 1 has two end sections 1 and 2 between which an arrangement 3, having at least one superconductive cable 4 (FIG. 2), is mounted. The transition stretch may have a length of, for example, 600 m. In addition, along the extension of the transition stretch, at least one connection point for connecting respectively two arrangements 3 can be arranged. In the end sections 1 and 2, the superconductive cable 4 is connected to electrical elements in accordance with conventional technology. In the illustrated embodiment, the end section 2 is connected to two supply containers 5 and 6 which each contain a cooling agent. In the supply container 5, advantageously, helium gas is provided while the supply container 6 advantageously contains liquid nitrogen as the second cooling agent. The cooling agents are conducted through pipelines 7 and 8 into the end section 2 and are conducted in accordance with known technology by means of pumps under pressure into two cryostats K1 and K2 (FIG. 2) which surround the cable 4.

Supply containers with cooling agent may also be present at the end section 1 and possibly at a connection point. For obtaining and maintaining the low temperature of the helium gas, advantageously a suitable cooling plant is used and the helium gas is advantageously circulated through the arrangement.

Figure 2:
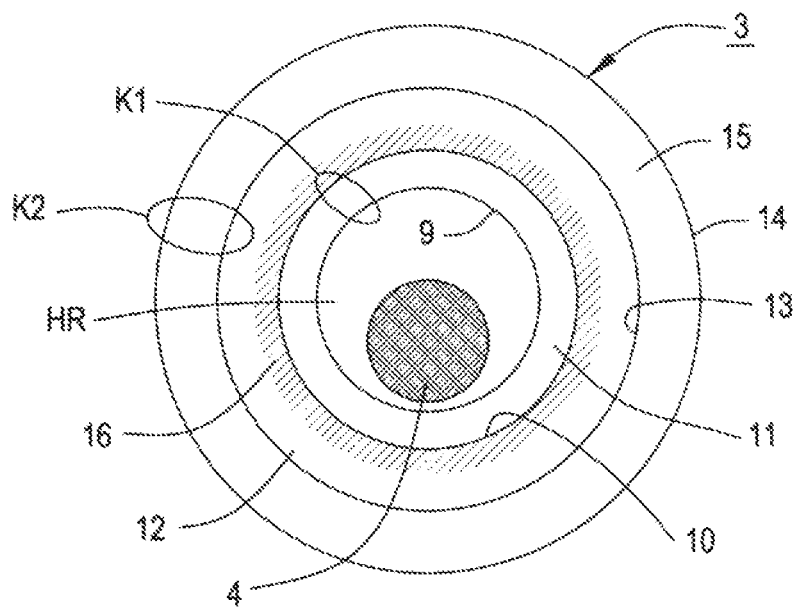
FIG. 2 shows a cross sectional view of the arrangement according to the invention on a larger scale.

In the arrangement according to FIG. 2, a superconductive cable 4 is schematically illustrated who construction is essentially known, and known in various configurations or embodiments. Magnesium diboride is used in the cable 4 for its conductor and possibly also for a magnesium diboride screen. The cable 4 may also serve for transmitting electrical energy in the middle voltage range (starting from about 1 kV) and in the high voltage range (starting from about 80 kV).

The cable 4 is surrounded by a first cryostat K1 which is composed of two pipes 9 and 10 of metal, wherein the pipes extend concentrically and at a distance from each other. However, it is also possible to arrange two or more superconductive cables in the cryostat K1. In addition to a spacer member, a vacuum insulation 11 as a thermal insulation is arranged between the two pipes 9 and 10 of the first cryostat K1. The pipes 9 and 10 advantageously are of high grade steel.

They may be undulated transversely of their longitudinal direction. The first cryostat K1 surrounds a hollow space HR in which the cable 4 is arranged and through which helium gas is pumped during the operation of the arrangement from the supply container 5. During the operation of the arrangement, the superconductive material, the magnesium diboride, is cooled to a temperature of 39K or lower.

While maintaining a concentric intermediate space 12 a second cryostat K2 is arranged around the first cryostat K1, wherein the second cryostat K2 is constructed similar or identical to the first cryostat K1. The second cryostat K2 is composed of two pipes 13 and 14 of metal which are arranged concentrically and at a distance from each other, wherein the pipes 13 and 14 enclose a vacuum insulation 15 therebetween. A spacer member is arranged between the pipes 10 and 13 as well as between the pipes 13 and 14.

During the operation of the arrangement, for example, liquid nitrogen as the second cooling agent, is pumped through the second cryostat K2, to with through the intermediate space 12 from the supply container 6. As a result, the intermediate space is cooled, for example, to about 67K to 77K. It is also possible to use LNG which has been cooled to at least 112K or liquid oxygen which has been cooled to a temperature of at least 90K, as the second cooling agent. The second cooling agent, preferably the liquid nitrogen which will be considered in the following, constitutes together with the second cryostat K2 an effective heat shield for the first cryostat K1, so that the helium gas conducted through the first cryostat K1 is protected from being heated too quickly by the heat coming from outside.

The high voltage resistant insulation 16, or the dielectric of the cable 4 is mounted in the intermediate space 12, namely as a layer of a high voltage resistant insulation material which completely surrounds the first cryostat K1 and which rests on the outer pipe 10 of the first cryostat K1. For example, paper or paper coated with a synthetic material can be used as insulation material for the insulation 16. Liquid nitrogen flows around the insulation 16 in the intermediate space 12 and the insulation is also impregnated thereby, so that an increasing dielectric strength of the insulation is obtained. Advantageously, all elements of metal surrounded by the insulation 16 are at a potential with increased voltage, advantageously at a high voltage potential. When the cable of a superconductive screen is used, the screen is arranged in the intermediate space 12 above the insulation 16. For example, oxidic superconductive materials are advantageously used for the screen.

The invention claimed is:

1. Superconducting arrangement comprising:
   at least one superconductive cable;
   a first cryostat surrounding the superconductive cable for conducting a first cooling agent therethrough,
   wherein the first cryostat is composed of two metal pipes which are arranged coaxially and at a distance from each other and form a thermal insulation therebetween, and
   wherein the first cryostat encloses a hollow space over its entire length in which the cable is arranged and through which, during operation of the arrangement, the first cooling agent is conducted,
   wherein, as the first cooling agent a liquid gas cooled to a temperature of 39K or lower, or a less cooled liquid or gaseous cooling agent, are used; and
   a second cryostat is formed around the first cryostat, said second cryostat is composed of two pipes formed coaxially with and at a distance from the first cryostat for conducting a second cooling agent,
   wherein a liquefied gas having a temperature of 112K or lower is conducted,
   wherein magnesium diboride is used as superconductive material in said superconductive cable, and
   wherein high voltage insulation is arranged in the intermediate space between the first cryostat and the second cryostat, said high voltage insulation completely surrounding and resting on an outer pipe of the first cryostat, and wherein during operation of the arrangement liquefied gas flows through the intermediate space and impregnates the high voltage insulation.

2. Arrangement according to claim 1, wherein helium gas is used as the first cooling agent.

* * * * *